United States Patent
Diaz

(10) Patent No.: US 7,391,124 B2
(45) Date of Patent: Jun. 24, 2008

(54) METHOD AND SYSTEM FOR PRODUCING ELECTRICITY

(76) Inventor: Angel Severino Diaz, Av. Balboa Edifico Baneo, BBVA, Torre Menor Piso #5, Panama (PA)

( * ) Notice: Subject to any disclaimer, the term of this patent is extended or adjusted under 35 U.S.C. 154(b) by 0 days.

(21) Appl. No.: 11/440,456

(22) Filed: May 25, 2006

(65) Prior Publication Data
US 2007/0119148 A1    May 31, 2007

Related U.S. Application Data

(60) Provisional application No. 60/684,180, filed on May 25, 2005.

(51) Int. Cl.
*H02P 9/04* (2006.01)
(52) U.S. Cl. .......... 290/1 R; 310/301; 310/302
(58) Field of Classification Search ......... 290/1 R; 60/203.1; 310/11, 301, 306
See application file for complete search history.

(56) References Cited

U.S. PATENT DOCUMENTS

| | | | | |
|---|---|---|---|---|
| 2,936,273 A | * | 5/1960 | Untermyer | 376/207 |
| 3,153,617 A | * | 10/1964 | De Felice | 376/207 |
| 4,175,381 A | * | 11/1979 | Scragg et al. | 60/39.12 |
| 4,696,789 A | * | 9/1987 | Oda et al. | 376/254 |
| 4,816,211 A | * | 3/1989 | Parker et al. | 376/323 |
| 5,245,643 A | * | 9/1993 | Dix et al. | 376/371 |
| 5,247,796 A | * | 9/1993 | Parker et al. | 60/673 |
| 5,267,286 A | * | 11/1993 | Hirukawa | 376/353 |
| 6,109,037 A | * | 8/2000 | Kumagai et al. | 60/677 |
| 6,121,569 A | * | 9/2000 | Miley et al. | 219/121.48 |
| 6,278,757 B1 | * | 8/2001 | Yokomizo et al. | 376/377 |
| 6,768,326 B2 | * | 7/2004 | Brown et al. | 324/752 |

FOREIGN PATENT DOCUMENTS

WO    WO 2005/001845 A2  *  1/2005

* cited by examiner

*Primary Examiner*—Julio Gonzalez
(74) *Attorney, Agent, or Firm*—Berenato, White & Stavish

(57) ABSTRACT

A method and system for producing electricity, and more particularly to a method of producing electricity by producing steam by directing Gamma rays generated by directing X-rays at a mass of Hafnium 178 onto a mass of water. The steam thereafter is channeled to a steam turbine generator to produce electricity.

5 Claims, 2 Drawing Sheets

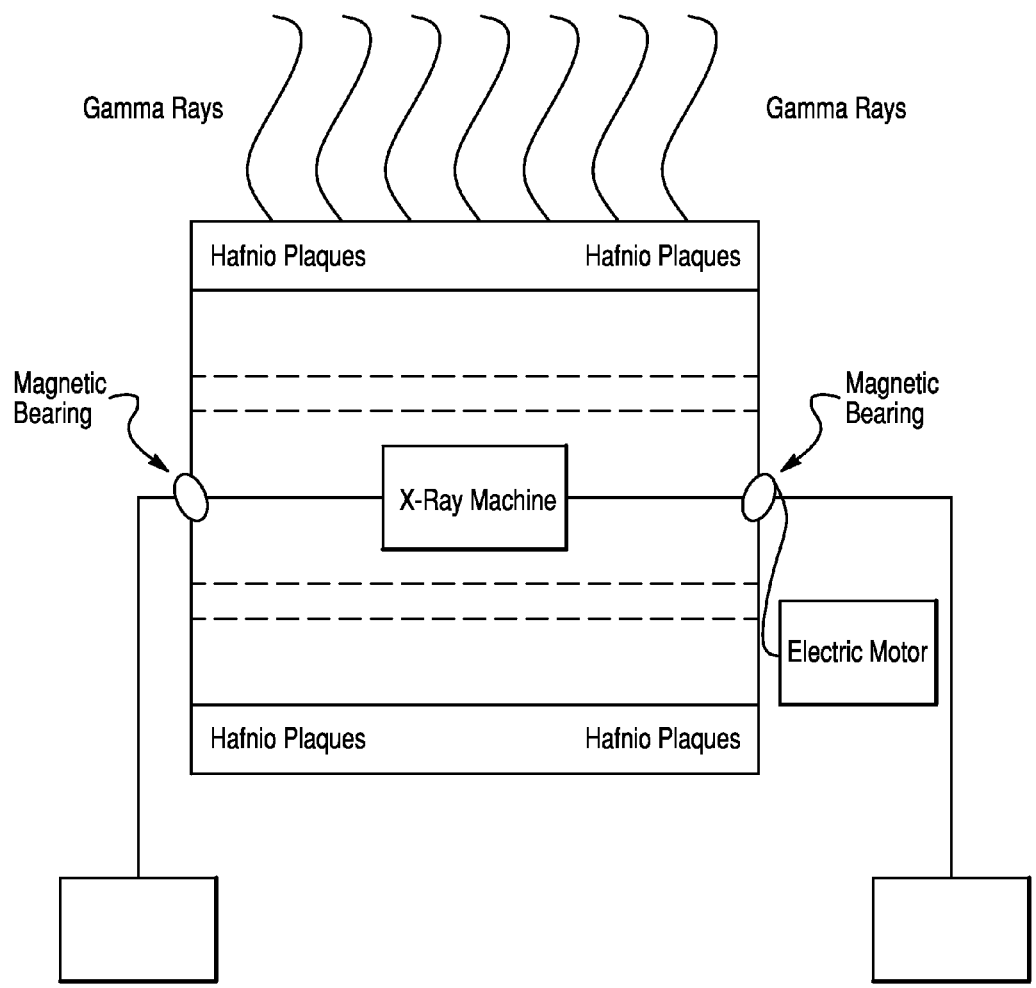

METHOD AND SYSTEM FOR PRODUCING ELECTRICITY

This application claimed the benefit of U.S. provisional application 60/684,180 filed on May 25, 2005 and is hereby incorporated herein by reference.

FIELD OF THE INVENTION

The present invention is directed to a method of producing electricity, and more particularly to a method of producing electricity producing Gamma rays generated by directing X-rays at a mass of Hafnium 178.

DETAILED DESCRIPTION OF THE PREFERRED EMBODIMENT

Figure 1:
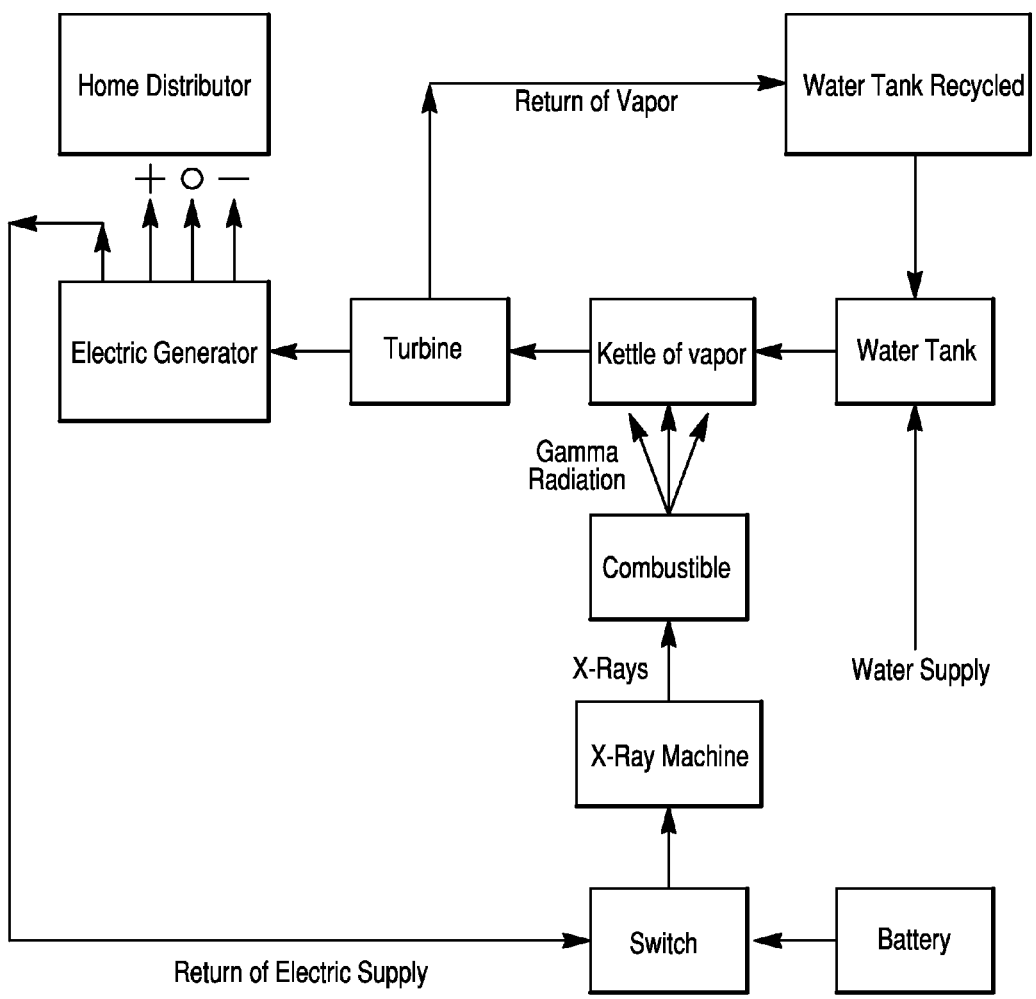
FIG. 1 depicts a diagram of the method of producing electricity according to the present invention.

FIG. 1 depicts a diagram of the present invention.

FIG. 2 depicts a preferred embodiment of the present invention.

Referring to FIG. 1, an X-ray machine is provided for generating X-rays. A battery source is provided for initially running the X-ray machine. The X-ray machine is initiated to generate X-rays. The generated X-rays are directed onto a mass of Hafnium which decreases the energy levels of the nucleus of the Hafnium atoms. This causes dramatic liberation of Gamma radiation. The Gamma rays are directed at a mass of water in a collecting tank. The water is heated by the Gamma rays thereby producing steam. Continued production of steam causes a build up in pressure and pressurized steam is channeled to a steam turbine which is in turn connected to a current generator. It is to be understood that steam turbines and electrical generators are well know in to those of ordinary skill in the art and need not be elaborated. Once the turbine and current generator are running efficiently, the X-ray machine is run by the produced current and the battery source disconnected via the interrupter. The same current used by the generator and carried to a switch, allows the X-ray machine to work as the circuit. Once the process begins to operate as a functioning circuit, the battery stops operating the circuit works independently. Excess electrical current produced by the generator may then be supplied to a desired electrical demand.

Water vapor exiting the turbine is fed to a condenser and subsequently returns water to the collecting tank where the cycle continued.

The radiation emitted by the X-ray machine and the Gamma rays emitted from the Hafnium-178 are not dangerous to Humans. The X-ray machine and Hafnium-178 are sealed within a protective cover similar to conventional covers employed to protect from microwaves. Hafnium is even more hermetic.

Referring to FIG. 2, the method may employ a vacuum room. The X-ray machine will be held on a steady base. The Hafnium-178 plaques are joined to a module in which this module will be held with a magnetic bearing. The module with the magnetic bearing will be joined with an electric motor that will help the Hafnium-178 plaques rotate around the X-ray machine. These plaques will be hit individually by the X-rays making the Hafnio-178 molecules to become excited. These excited molecules of the Hafnium-178 will let free the gamma rays that are going to hit the boiler of steam. This steam will turn a turbine that will make the electrical generator give electricity to the community.

The present invention thus creates an efficient and clean method of producing electricity. While the best mode for carrying out the invention had been described, those familiar with the art to which this invention relates will recognize various alternatives, designs and embodiments for practicing the present invention as defined by the following claims.

What is claimed is:

1. A method of producing electricity comprising the steps of:
   initially energizing an x-ray machine by a battery source to produce x-rays;
   directing said X-rays onto a mass of Hafnium-178 thereby producing Gamma radiation;
   directing said Gamma radiation at a mass of water causing said water to heat and produce steam;
   channeling said steam to a steam turbine connected to an electric generator, wherein said steam drives said steam turbine and said electrical generator to produce electricity; and
   subsequently energizing said x-ray machine with said electricity produced by said electric generator.

2. The method according to claim 1, wherein said step of subsequently energizing said x-ray machine with said electricity by said electric generator includes the step of disconnecting said battery source with an interruptor and providing a portion of said electricity produced by said electric generator to said X-ray machine with a switch.

3. The method according to claim 2, further comprising the step of sealing said x-ray machine and Hafnium with a protective cover.

4. The method according to claim 1 further comprising the steps of:
   securing said x-ray machine on a steady base
   joining Hafnium-178 plaques to a module;
   holding said module with a magnetic bearing; and
   rotating said module around the X-ray machine with an electric motor.

5. A method of producing electricity comprising the steps of:
   securing an x-ray machine in a steady base;
   joining Hafnium-178 plaques to a module;
   holding said module with a magnetic bearing;
   rotating said module around said X-ray machine;
   energizing said x-ray machine by a battery source to produce x-rays;
   directing said X-rays onto said Hafnium-178 plaques thereby producing Gamma radiation;
   directing said Gamma radiation at a mass of water causing said water to heat and produce steam; and
   channeling said steam to a steam turbine connected to an electric generator, wherein said steam drives said steam turbine and said electrical generator to produce electricity.

* * * * *